United States Patent
Rostoker et al.

(10) Patent No.: US 9,959,072 B2
(45) Date of Patent: May 1, 2018

(54) SYSTEMS AND METHODS OF COMPRESSING DATA

(71) Applicant: SanDisk Technologies LLC, Plano, TX (US)

(72) Inventors: Tal Rostoker, Kfar Vradim (IL); Alon Marcu, Tel-Mond (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 67 days.

(21) Appl. No.: 14/502,554

(22) Filed: Sep. 30, 2014

(65) Prior Publication Data

US 2015/0178013 A1 Jun. 25, 2015

Related U.S. Application Data

(60) Provisional application No. 61/919,614, filed on Dec. 20, 2013.

(51) Int. Cl.
*G06F 3/06* (2006.01)

(52) U.S. Cl.
CPC .......... *G06F 3/0644* (2013.01); *G06F 3/0608* (2013.01); *G06F 3/0656* (2013.01); *G06F 3/0679* (2013.01)

(58) Field of Classification Search
CPC .... G06F 3/0644; G06F 3/0608; G06F 3/0656; G06F 3/0679
USPC ......................................................... 711/115
See application file for complete search history.

(56) References Cited

U.S. PATENT DOCUMENTS

| 5,870,036 A | * | 2/1999 | Franaszek | ........... | H03M 7/3086 341/51 |
| 5,990,810 A | * | 11/1999 | Williams | .............. | G06F 3/0608 341/51 |
| 6,100,825 A | * | 8/2000 | Sedluk | ................ | H03M 7/3088 341/51 |

(Continued)

FOREIGN PATENT DOCUMENTS

| WO | 0019293 A2 | 4/2000 |
| WO | 2011087602 A1 | 7/2011 |
| WO | 2013100959 A1 | 7/2013 |

OTHER PUBLICATIONS

Michael Burrows, Charles Jerian, Butler Lampson, and Timothy Mann. Oct. 12-15, 1992. On-line data compression in a log-structured file system. In Proceedings of the fifth international conference on Architectural support for programming languages and operating systems (ASPLOS V), Richard L. Wexelblat (Ed.). ACM, New York, NY, USA, 2-9.*

(Continued)

*Primary Examiner* — Ramon A Mercado
(74) *Attorney, Agent, or Firm* — Patterson + Sheridan, LLP

(57) ABSTRACT

A method includes, in response to a first write command corresponding to first data and a first context which is identifiable with a first identifier and to a second write command corresponding to second data and a second context identifiable with a second identifier, determining whether the first identifier of the first context matches the second identifier of the second context. The method also includes, if the first identifier of the first context is determined to match the second identifier of the second context, forming a compression group of data including the first data and the second data, and generating compressed data corresponding to the compression group of data.

32 Claims, 7 Drawing Sheets

(56) References Cited

U.S. PATENT DOCUMENTS

| | | | |
|---|---|---|---|
| 6,446,145 B1* | 9/2002 | Har | G06F 12/08 710/68 |
| 6,618,397 B1* | 9/2003 | Huang | H04L 29/06 370/392 |
| 6,711,635 B1* | 3/2004 | Wang | G06F 3/0613 710/52 |
| 7,081,377 B2* | 7/2006 | Cleeves | H01L 23/5252 257/E23.147 |
| 7,433,994 B2 | 10/2008 | Peterson et al. | |
| 8,327,051 B2 | 12/2012 | Kang | |
| 8,533,558 B2 | 9/2013 | Yurzola et al. | |
| 8,533,564 B2* | 9/2013 | Yurzola | G06F 11/1048 714/763 |
| 2002/0073298 A1* | 6/2002 | Geiger | G06F 12/023 711/206 |
| 2002/0091905 A1* | 7/2002 | Geiger | H03M 7/30 711/170 |
| 2002/0118307 A1* | 8/2002 | Lee | G06F 12/023 348/714 |
| 2003/0093617 A1 | 5/2003 | Green | |
| 2007/0283081 A1* | 12/2007 | Lasser | G06F 12/0246 711/103 |
| 2008/0005141 A1* | 1/2008 | Zheng | G06F 3/0608 |
| 2010/0287200 A1 | 11/2010 | Dhuse | |
| 2012/0102005 A1* | 4/2012 | Kamei | G06F 3/0608 707/693 |
| 2013/0073816 A1* | 3/2013 | Seo | G06F 12/0246 711/154 |
| 2013/0179409 A1* | 7/2013 | Amit | H03M 7/30 707/693 |
| 2013/0205110 A1 | 8/2013 | Kettner | |
| 2013/0246721 A1* | 9/2013 | Fukutomi | G06F 3/0604 711/155 |
| 2015/0052292 A1* | 2/2015 | Mylly | G06F 3/0679 711/103 |

OTHER PUBLICATIONS

R. Karedla, J. S. Love and B. G. Wherry, "Caching strategies to improve disk system performance," in Computer, vol. 27, No. 3, pp. 38-46, Mar. 1994.*

The International Search Report and Written Opinion dated Mar. 27, 2015 in International Application No. PCT/US2014/069240, 12 pages.

International Preliminary Report on Patentability dated Jun. 30, 2016 in International Application No. PCT/US2014/069240, 10 pages.

* cited by examiner

SYSTEMS AND METHODS OF COMPRESSING DATA

REFERENCE TO EARLIER-FILED APPLICATIONS

This application claims priority from U.S. Provisional Patent Application No. 61/919,614, filed Dec. 20, 2013, the contents of which are incorporated by reference herein in their entirety.

FIELD OF THE DISCLOSURE

The present disclosure is generally related to compressing data for storage at a data storage device.

BACKGROUND

Some host devices and data storage devices use data compression to efficiently utilize storage capacity of a memory. Data compression is performed by encoding data that includes a first set of bits to generate a second set of bits, where the second set of bits includes fewer bits than the first set of bits. Thus, compressed data is represented using fewer bits than were used to represent the original data. Accordingly, the compressed data can be stored in the memory using less of the memory's available storage capacity.

Generally, data compression removes redundant or unnecessary information from the data. Data compression tends to be more space-efficient when larger blocks of data are compressed together rather than when smaller blocks of data are compressed together. For example, when a large block of data is compressed, more of the bits may be considered redundant than would be the case if the large block of data were divided into a number of smaller blocks of data prior to compression. Thus, more bits may be removed by compressing the large block of data (as a unit) rather than by compressing the separate smaller blocks.

However, compression and decompression of data takes time and consumes power. Additionally, data that was compressed together generally must be decompressed as a whole, regardless of whether only a portion of the data is requested by the host device. Thus, while compressing a large block of unrelated data together may save space, when the host device requests a portion of the data, the entire large block (including unrelated portions) has to be decompressed to access the desired portion. Decompressing large blocks of data is time and power intensive. Also, delays associated with large block decompression operations may lead to a dissatisfactory user experience.

SUMMARY

In a particular embodiment, information provided by a host device is used to control compression of data at a data storage device. For example, the host device may provide a context identifier to the data storage device as part of a write instruction. The context identifier may be generated and provided by the host device according to an eMMC standard (e.g., the context identifier may be included in an eMMC context ID field), according to Universal Flash Storage (UFS) standard (e.g., the context identifier may be included in a UFS context ID field), or both. The data storage device may use the context identifier to identify data that is related or likely to be accessed together. During a write operation, the data storage device may generate compression groups using data related by context identifier. The data storage device may perform context matching for compression on-the-fly or alternatively may perform context matching for compression offline, such as by storing the context identifier associated with the access, matching it offline and compressing accordingly. Data from a compression group may be compressed together (e.g., as a single unit) to generate compressed data to write to a memory of the data storage device. If a compression group is too large (e.g., greater than a threshold size) the compression group may be split up into two or more sub-groups for compression. During a read operation, compressed data associated with a compression group may be decompressed together (e.g., as a unit). Accordingly, the data storage device is able to efficiently utilize storage capacity of the memory and to avoid decompressing large quantities of unrelated data during a read operation.

DETAILED DESCRIPTION

Figure 1:
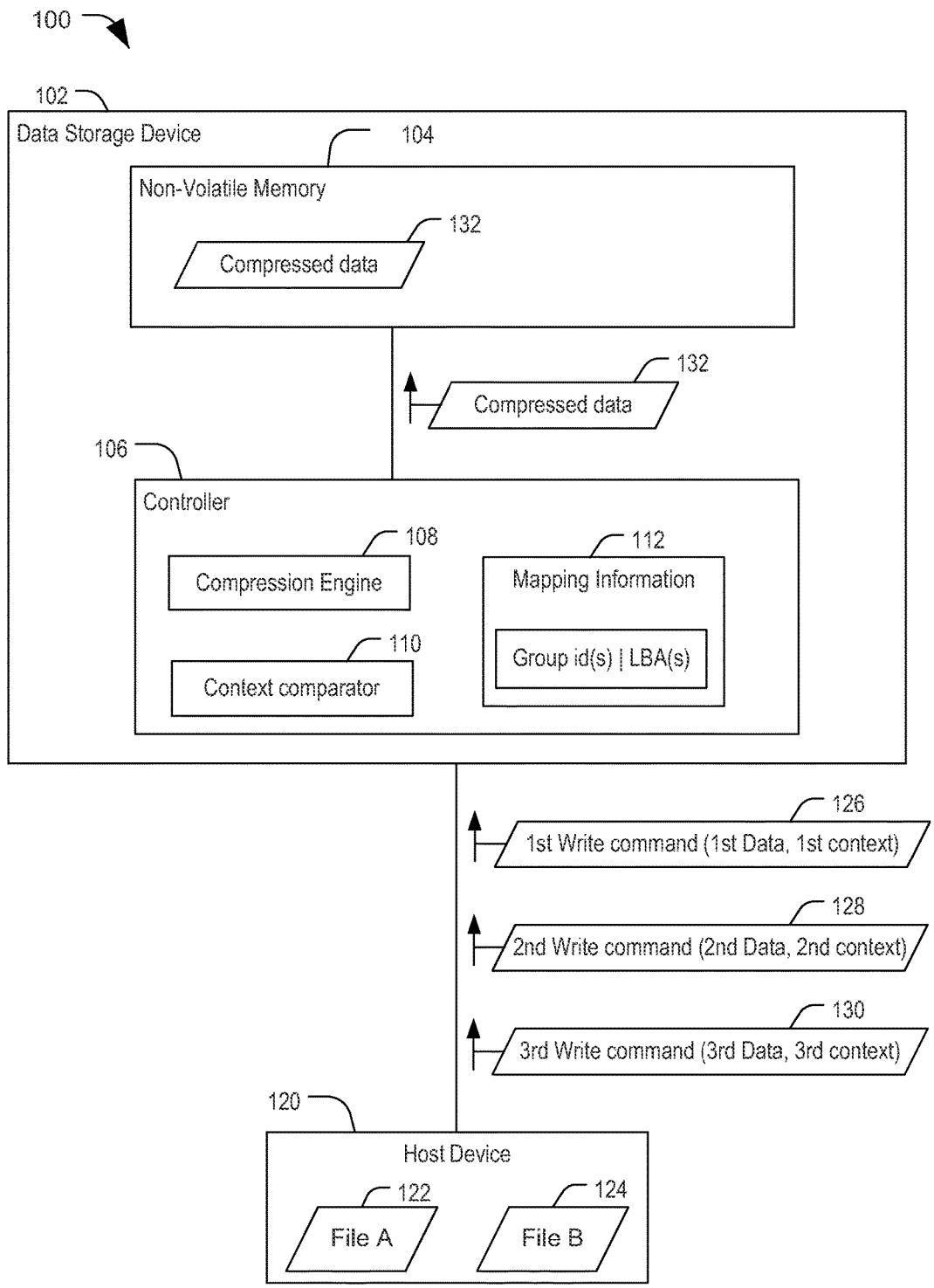
FIG. 1 is a block diagram of a first particular embodiment of a system including a data storage device configured to compress data for storage.

FIG. 1 is a block diagram of a first particular embodiment of a system 100 including a data storage device 102 configured to compress data for storage. The data storage device 102 includes a controller 106 and a memory 104 (e.g., a non-volatile memory). In a particular implementation, the memory 104 is on a memory die that is separate from the controller 106 and coupled to the controller 106 via a bus. In other implementations, the memory 104 and the controller 106 may be on a common die.

The memory 104 may be a non-volatile memory, such as a Flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memories), an erasable programmable read-only memory (EPROM), an electrically-erasable programmable read-only memory (EEPROM), a read-only memory (ROM), a Resistive Random Access Memory (RRAM or ReRAM), a one-time programmable memory (OTP), or any other type of memory. The memory 104 may have a three-dimensional (3D) memory configuration, such as a vertical bit line (VBL) 3D architecture. For example, the memory 104 may include a 3D VBL ReRAM. In a particular implementation, the memory 104 is a non-volatile memory having a 3D memory configuration that is monolithically formed in one or more physical levels of arrays of memory cells having an active area disposed above a silicon substrate. Alternatively, the memory 104 may have another configuration, such as a two-dimensional (2D) memory configuration or a stacked 2D memory configuration.

The data storage device 102 may be configured to interface with a host device 120. The host device 120 may be configured to provide data to the data storage device 102 for storage at the memory 104 and to request data to be read from the memory 104. For example, the host device 120 may include a mobile telephone, a music player, a video player, a gaming console, an electronic book reader, a personal digital assistant (PDA), a computer, such as a laptop computer, notebook computer, or tablet, any other electronic device, or any combination thereof. The host device 120 communicates via a memory interface that enables reading from the data storage device 102 and writing to the data storage device 102. For example, the host device 120 may operate in compliance with a Joint Electron Devices Engineering Council (JEDEC) industry specification, such as an embedded MultiMedia Card (eMMC) specification. As other examples, the host device 120 may operate in compliance with a Universal Flash Storage (UFS) Host Controller Interface specification, with a Universal Serial Bus (USB) specification, or with a Secure Digital (SD) Host Controller specification, as illustrative examples. Alternatively, the host device 120 may communicate with the data storage device 102 in accordance with another communication protocol.

In a particular embodiment, the data storage device 102 is configured to be coupled to the host device 120 as embedded memory. In another particular embodiment, the data storage device 102 is a removable device that is coupled to the host device 120. For example, the data storage device 102 may be a memory card. The data storage device 102 may operate in compliance with a JEDEC industry specification, one or more other specifications, or a combination thereof. For example, the data storage device 102 may operate in compliance with an eMMC specification, in compliance with a USB specification, a UFS specification, an SD specification, or a combination thereof.

In a particular embodiment, the data storage device 102 is configured to receive data from the host device 120 for storage at the memory 104. The host device 120 may provide a context identifier with the data. The context identifier may be used by the data storage device 102 to identify related data. For example, the host device 120 may include or perform operations related to a first file 122 and a second file 124. The first file 122 may be associated with a first context, and the second file 124 may be associated with a second context. The host device 120 may assign a first context identifier to the first context and may assign a second context identifier to the second context. Although contexts are associated with files in FIG. 1, this is only for convenience of illustration. In various implementations, the host device 120 may assign context identifiers to applications, processes, or data sets.

The controller 106 may use the context identifiers to determine which data should be group together for compression. For example, the controller 106 may be configured to receive first data via a first write command 126 from the host device 120. The first write command 126 may include a first context identifier that identifies a first context associated with the first data. The controller 106 may also receive second data via a second write command 128 from the host device 120. The second data may include a second context identifier that identifies a second context associated with the second data. The first context and the second context may be the same. For example, the first data and the second data may both be associated with the first file 122. Alternatively, the first context and second context may be different. For example, the first data may be associated with the first file 122, and the second data may be associated with the second file 124.

After receiving the first data and second data, the controller 106 may determine whether the first context matches the second context. For example, a context comparator 110 may compare the first context identifier to the second context identifier. Conditioned upon the first context matching the second context, the controller 106 may generate compressed data for storage at the memory 104 using the first data and the second data. For example, the controller 106 may assign the first data and the second data to a compression group of data. The compression group of data may be compressed (e.g., as a unit) to generate compressed data 132. For example, the compression group of data may be formed by combining (e.g., merging) the first data and the second data. In this example, the compression engine 108 may compress the data of the compression group of data together to form the compressed data 132. Accordingly, the compressed data 132 corresponds to a compressed version of the first and second data together.

In a particular embodiment, the first write command 126, the second write command 126, or both, may include information from the host device 120 indicating whether data associated with each write command is compressible. For example, the first write command 126 may include a flag, data, an identifier of the data, or other information from the host device 120 that indicates whether the first data is compressible. To illustrate, the first data may not be compressible when the host 120 has already compressed the first data. In another example, the first data may not be compressible due to a type or nature of the first data.

In a particular embodiment, the data storage device 102 may receive multiple write commands, such as the first write command 126, the second write command 128, and a third write command 130, prior to performing compression. For example, if the first data received from the host device 120 is compressible, the controller 106 may temporarily store the first data (e.g., by writing the first data to a region of the memory 104) after receiving the first write command 126 and prior to receiving the second write command 128. If the first data is not compressible, the first data may be stored at the memory 104 without compression. After receiving the second write command 128, the context comparator 110 may compare a context identifier of the first write command 126 to a context identifier of the second write command 128. The controller 106 may generate a compression group of data including the first data and the second data if the first context identifier matches the second context identifier. For example, the compression group of data may be generated by reading the first data from the region of memory and combining the first data and the second data to form the compression group of data. The controller 106 may provide the compression group of data to the compression engine 108 to generate the compressed data 132.

When the context comparator 110 determines that the context identifiers are distinct (i.e., the first context identifier does not match the second context identifier), the second data may be temporarily stored (e.g., by writing the second data to the region of memory) to await arrival of other data related to the second context. When the third write command 130 is received, the context comparator 110 may compare a third context identifier associated with the third write command 130 to the first context identifier, the second context identifier, or both. If the third context identifier matches the first context identifier, the third data may be combined with the first data to form a compression group of data including the first data and the third data. Alternatively, if the third context identifier matches the second context identifier, the third data may be combined with the second data to form a compression group of data including the second data and the third data. The compression group of data may be compressed to form compressed data 132.

In a particular embodiment, the controller 106 may perform a compression operation on a compression group of data to form the compressed data when the compression group of data reaches a threshold size. For example, when the first write command 126 is received, the controller 106 may determine whether the first data satisfies the threshold, e.g., has a size that is greater than or equal to the threshold size. When the first data is smaller than the threshold size, the controller 106 may write the first data to a region of memory to await additional data associated with the first context. When the second write command 128 is received, if the second context matches the first context, the controller 106 may form a compression group of data including the first data and the second data. The controller 106 may then compare a size of the compression group of data to the threshold size. If the size of the compression group of data satisfies (e.g., is greater than or equal to) the threshold size, the controller 106 may direct the compression engine 108 to generate the compressed data 132. However, if the size of the compression group of data does not satisfy the threshold size (e.g., is less than the threshold size), the controller 106 may temporarily store the second data (e.g., write the second data to the region of the memory 104) to await additional data associated with the same context.

After receipt of the third write command 130, the context comparator 110 may determine whether the third data is associated with the same context as the first data and the second data. If the third data is associated with the same context as the first data and the second data, the controller 106 may add the third data to the compression group of data that includes the first data and the second data. The controller 106 may determine whether the size of the compression group of data satisfies the threshold size (e.g., is greater than or equal to the threshold size). If the size of the compression group of data satisfies the threshold size, the controller 106 may direct the compression engine 108 to generate the compressed data 132 based on the compression group of data. If the size of the compression group of data does not satisfy the threshold size, the controller 106 may temporarily store the third data (e.g., by writing the third data to the region of the memory 104) to wait receipt of additional data related to the same context.

Figure 2:
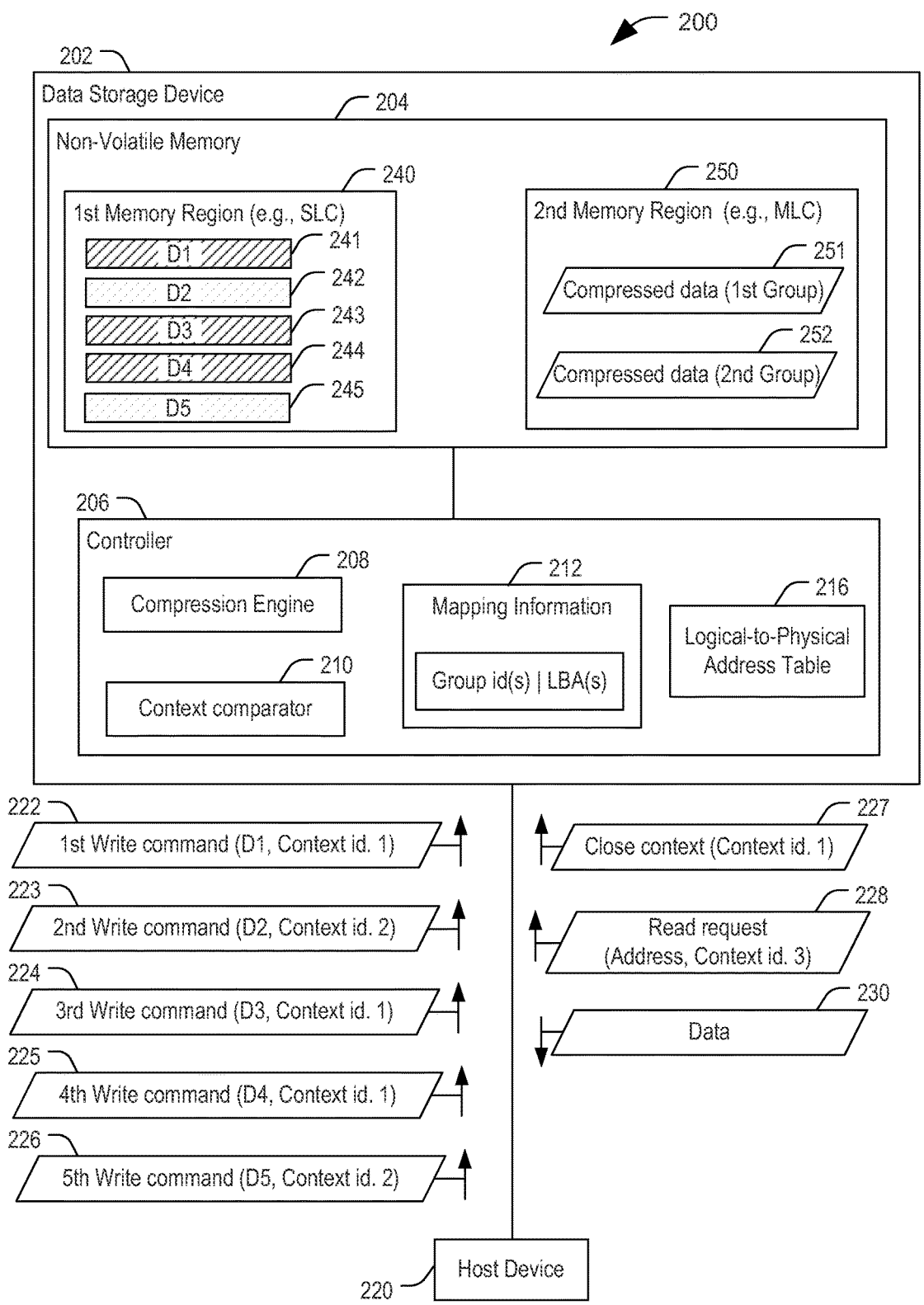
FIG. 2 is a block diagram of a second particular embodiment of a system including a data storage device configured to compress data for storage.

In a particular embodiment, when the host device 120 ceases use of a context (e.g., closes a file or ceases a process), the host device 120 transmits a close context notification (as described further with reference to FIG. 2). The close context notification includes the context identifier of the context that is being closed. When the data storage device 102 receives a close context notification, the controller 106 may determine whether data that is temporarily stored is associated with the closed context. The controller 106 may direct the compression engine 108 to generate compressed data based on the compression group of data associated with the closed context (e.g., regardless of the size of the compression group of data when the close context notification is received).

After the compression group of data is compressed to generate the compressed data 132, the compressed data 132 may be written to storage elements of the memory 104 corresponding to one or more addresses. The controller 106 may store mapping information 112 that maps a group identifier of the compressed data 132 to the one or more addresses. For example, the mapping information 112 may identify the group identifier and one or more logical block addresses corresponding to a storage location of the compressed data 132. The particular set of logical block addresses to which the compressed data 132 is written may define a sequential range of logical block addresses.

The group identifier may be associated with the compression group of data corresponding to the compressed data 132. In a particular embodiment, the group identifier is assigned to the compression group of data by the controller 106 (e.g., the group identifier is distinct from the context identifier assigned by the host device 120). In another particular embodiment, the group identifier includes or corresponds to the context identifier associated with the data grouped in the compression group of data (e.g., the group identifier corresponds to the context identifier assigned by the host device 120).

In some implementations, the host device 120 may reuse context identifiers. For example, while the host device 120 is using the first file 122, the first context identifier may be associated with the first file 122. After the host device 120 closes or ceases operations on the first file 122, the host device 120 may open another file (e.g., the second file 124). The host device 120 may assign a context identifier to the second file 124, which may be the same as the context identifier assigned to the first file 122 when the first file 122 was open and in use. Accordingly, in an implementation in which the host device 120 reuses context identifiers, when the host device 120 has ceased operations associated with a particular context, the host device 120 may send a close context notification to the data storage device 102. When the data storage device 102 receives a subsequent write command associated with a context identifier that was previously closed, the controller 106 may assign a new group identifier to a compression group of data associated with the context identifier.

After writing the compressed data 132 to the memory 104, the data storage device 102 may receive a read command from the host device 120 or from another host device (not shown). The read command may identify a set of storage elements to be read (e.g., by providing an address, such as a particular logical block address, associated with the set of storage elements). The controller 106 may determine whether the address identified in the read command is associated with a group identifier in the mapping information 112. When the address is associated with a group identifier in the mapping information 112, the controller 106 may read data from each storage element corresponding to a memory address that is associated with the group identifier in the mapping information 112. For example, when the address is associated with a first group identifier in the mapping information, the controller 106 may determined physical (or logical) addresses of the memory 104 that correspond to the group identifier in the mapping information 112. The group identifier is associated, in the mapping information 112, with storage locations of an entire compression group of data. The controller 106 may read each storage location that is associated with the group identifier. Thus, the controller 106 reads compressed data corresponding to an entire compression group of data (e.g., rather than only the address identified by the read command). The controller 106 may cause the compression engine 108 to decompress the data read from the memory 104. Accordingly, in response to the read command, the controller 106 may decompress compressed data 132 generated based on a compression group of data.

Thus, the data storage device 102 is able to efficiently utilize storage capacity of the memory 104 by compressing related data together. Additionally, by generating the compressed data 132 using a compression group of data corresponding to a single context, the data storage device 102 avoids latency and power usage associated with decompressing large quantities of unrelated data during a read operation.

FIG. 2 is a block diagram of a second particular embodiment of a system 200 including a data storage device 202 configured to compress data for storage. The data storage device 202 includes a memory 204 (e.g., a non-volatile memory) which may be divided (logically or physically) into multiple regions, such as a first memory region 240 and a second memory region 250. The data storage device 202 also includes a controller 206. The controller 206 includes a compression engine 208, a context comparator 210, and mapping information 212. The controller 206 also includes or has access to a logical-to-physical address table 216. The data storage device 202 may be coupled to a host device 220 to receive data to write to the memory 204 or to receive commands to read data from the memory 204. In a particular embodiment, the data storage device 202 corresponds to the data storage device 102 of FIG. 1. For example, the controller 206 may correspond to the controller 106 of FIG. 1, and the memory 204 may correspond to the memory 104 of FIG. 1.

The compression engine 208 may be configured to generate compressed data for storage at the memory 204. In a particular embodiment, the compressed data is stored at the second memory region 250. The controller 206 may also temporarily store data at the first memory region 240 until the data is provided to the compression engine 208 to generate compressed data. In this embodiment, the second memory region 250 may correspond to a multilevel cell flash memory, and the first memory region 240 may correspond to a single level cell flash memory.

In operation, the host device 220 may provide a plurality of write commands 222-226 to the data storage device 202. Each of the write commands 222-226 may include data and a context identifier associated with the data. The context identifier may be assigned by the host device 120 and may indicate a particular operational context associated with the data within the host device 220. The context identifier may enable the controller 206 to identify related data to be compressed together.

The data storage device 202 may receive a first write command 222 including first data and a first context identifier from the host device 220. The controller 206 may write the first data to the first memory region 240 as first data 241. After receiving the first write command 222, the data storage device 202 may receive a second write command 223 including second data and a second context identifier from the host device 220. In response to receiving the second write command 223, the context comparator 210 may compare the second context identifier to the first context identifier of the first data 241. In FIG. 2, data stored in the first memory region 240 that is related to a first context is shown with cross-hatching and data related to a second context (distinct from the first context) is shown without crosshatching. Thus, in the example illustrated in FIG. 2, the first data 241 is related to the first context and the first context identifier, and the second data 242 is related to the second context and the second context identifier. The first context identifier does not match the second identifier since the first and second contexts are different. Because the first context identifier does not match the second context identifier, no compression group of data is formed using the first data and the second data.

After receiving the second write command 223, the data storage device 202 may receive a third write command 224 including third data and a third context identifier from the host device 220. The context comparator 210 may compare the third context identifier with context identifiers associated with other data stored in the first memory region 240 (e.g., the first context identifier and the second context identifier). In the example illustrated in FIG. 2, the third data is associated with the first context identifier (e.g., the third context identifier matches the first context identifier). Accordingly, the controller 206 may form a first compression group of data using the first data 241 and the third data 243.

The compression engine 208 may generate compressed data using a compression group of data when the compression group of data reaches a threshold size, when a close context notification related to a context associated with the compression group of data is received, or both. In the following discussion, a first example is described in which the compression engine 208 generates the compressed data when the compression group of data reaches a threshold size. Following the first example, a second example is described in which the compression engine 208 generates the compressed data after a close context notification related to the context associated with the compression group of data is received. Both the first example and the second example are described using FIG. 2. Additionally, a method corresponding to the first example is described with reference to FIG. 4, and a method corresponding to the second example is described with reference to FIG. 5

In the first example, after receiving the third write command 224, the controller 206 determines whether to generate compressed data based on a size of the first compression group of data. For example, the controller 206 may compare the size of the first compression group of data including the first data 241 and the third data 243 to the threshold size. If the size of the first compression group of data is greater than or equal to the threshold size, the controller 206 generates first compressed data 251 based on the first compression group of data. If the size of the first compression group of data is smaller than the threshold size, the controller 206 continues to wait for additional data related to the first context and does not yet generate the first compressed data 251.

After receiving the third write command 224, the data storage device 202 may receive a fourth write command 225 including fourth data 244 and a fourth context identifier from the host device 220. The context comparator 210 may compare the fourth context identifier with context identifiers associated with data stored in the first memory region 240 (e.g., the first context identifier and the second context identifier). In the example illustrated in FIG. 2, the fourth data 244 is associated with the first context (e.g., the fourth context identifier matches the first context identifier). Accordingly, the context comparator 210 adds the fourth data 244 to the first compression group of data that includes the first data 241 and the third data 243.

After the fourth data 244 is added to the first compression group of data, the controller 206 determines whether to generate the first compressed data 251 based on the first compression group of data. For example, the compression engine 208 may compare the size of the first compression group of data to the threshold size. If the size of the first compression group is equal to or greater than the threshold size, the compression engine 208 generates the first compressed data 251 based on the first compression group. If the size of the first compression group is less than the threshold size, the compression engine 208 continues to wait for additional data related to the first context and does not yet generate the first compressed data 251.

After receiving the fourth write command 225, the data storage device 202 may receive a fifth write command 226 including fifth data 245 and a fifth context identifier from the host device 220. The context comparator 210 may compare the fifth context identifier associated with the fifth data 245 to context identifiers associated with data stored in the first memory region 240 (e.g., the first context identifier associated with the first, third and fourth data 241, 243, 244, and the second context identifier associated with the second data 242). In the example illustrated in FIG. 2, the fifth data 245 is associated with the second context (e.g., the fifth context identifier matches the second context identifier). Accordingly, the fifth data 245 is combined with the second data 242 to form a second compression group of data. The controller 206 may determine whether to form second compressed data 252 based on the second compression group of data. For example, a size of the second compression group of data may be compared to the threshold size. If the size of the second compression group of data is greater than or equal to the threshold size, the compression engine 208 generates the second compressed data 252. If the size of the second compression group of data is less than the threshold size, the compression engine 208 waits for additional data related to the second context and does not yet generate the second compressed data 252.

In a particular embodiment, when the host device 220 completes processing associated with the first context, the host device 220 sends a close context notification 227 associated with the first context (e.g., including the first context identifier) to the data storage device 202. In response to receiving a close context notification (such as the close context notification 227) associated with a particular context, the controller 206 generates compressed data based on a compression group of data associated with the particular context. In the example illustrated in FIG. 2, the close context notification 227 includes the first context identifier. The first compression group of data, including the first data 241, the third data 243 and the fourth data 244, is associated with the first context identifier. Accordingly, the compression engine 208 generates the first compressed data 251 associated with the first compression group of data in response to receipt of the closed context notification 227.

After the first compressed data 251 is generated, the first compressed data 251 may be stored at the second memory region 250. A storage location (e.g., one or more memory addresses) of the first compressed data 251 may be identified in the mapping information 212 and associated with a group identifier. In a particular embodiment, the mapping information 212 may store group identifiers associated with compression groups of data and memory addresses (e.g., logical block addresses or physical address) at which compressed data corresponding to each compression group of data is stored. In a particular embodiment, compressed data associated with a single compression group of data may be stored in the memory 204 at a set of sequential logical block addresses. The controller 206 may assign a group identifier to each compression group of data or to corresponding compressed data. For example, a first group identifier may be assigned by the controller 206 to the first compressed data 251.

In the second example in which the compression engine 208 generates the compressed data after a close context notification related to the context associated with the compression group of data is received, the controller 206 may continue to add data to the first memory region 240 for each context until a close context notification for a particular context (e.g., the close context notification 227 related to the first context) is received. To illustrate, in FIG. 2, data associated with the first context identifier that is received by the data storage device 202 may continue to be written to the first memory region 240 until the closed context notification 227 is received (e.g., without comparing the compression group of data to the threshold size after receiving each write command).

After the closed context notification 227 is received, the controller 206 may determine whether data associated with the closed context (e.g., the first context) is too large to be compressed together efficiently. For example, the controller 206 may compare a size of the set of data associated with the closed context (e.g., the first data 241, the third data 243 and the fourth data 244 in this example) to the threshold size. If the size of the set of data associated with the closed context exceeds the threshold size, the controller 206 may divide the set of data associated with the closed context into a plurality of subgroups. In this example, each of the subgroups corresponds to one compression group of data. If the size of the set of data associated with the closed context is less than the threshold size, the controller 206 generates a single compression group of data including the set of data. The compression engine 208 generates compressed data based on each of the one or more compression groups of data.

After compressed data is generated (e.g., either according to the first example or according to the second example described above) and stored at the memory 204, the data storage device 202 may receive a read request 228 from the host device 220. The read request 228 may identify an address associated with data to be read. The read request 228 may also include a context identifier (e.g., a Nth context identifier). The controller 206 may access the logical-to-physical address table 216 to associate the address from the read request 228 with one or more storage locations of the memory 204. The controller 206 may also determine whether the address of the read request 228 is associated with a group identifier in the mapping information 212. When the address of the read request 228 is associated with a group identifier in the mapping information 212, the controller 206 may read compressed data associated with the group identifier from the second memory region 250. For example, the address of the read request 228 may correspond to a single logical block address of the memory 204. However, if the address is associated with a group identifier in the mapping information 212, the controller 206 may read data from more than the single logical block address. To illustrate, the controller 206 may read data from storage elements associated with each address of a set of addresses (e.g., possibly more than the single logical block address) corresponding to the group identifier from the second memory region 250. The compression engine 208 may generate the decompressed data corresponding to the compression group of data associated with the group identifier using data read from the storage elements. When the address of the read request 228 is not associated with a group identifier, only data corresponding to the specific address identified by the read request 228 is read. To illustrate, when the address of the read request 228 corresponds to a single logical block address, only data corresponding to the single logical block address is read and no additional data (e.g., data corresponding to a compression group of data) is read based on the read request 228. The decompressed data may be provided to the host device 220 as data 230.

Thus, the data storage device 202 is able to efficiently utilize storage capacity of the memory 204 by compressing related data together. Additionally, by generating compressed data using a compression group of data corresponding to a single context, the data storage device 202 avoids latency and power usage associated with decompressing large quantities of unrelated data during a read operation.

Figure 3:
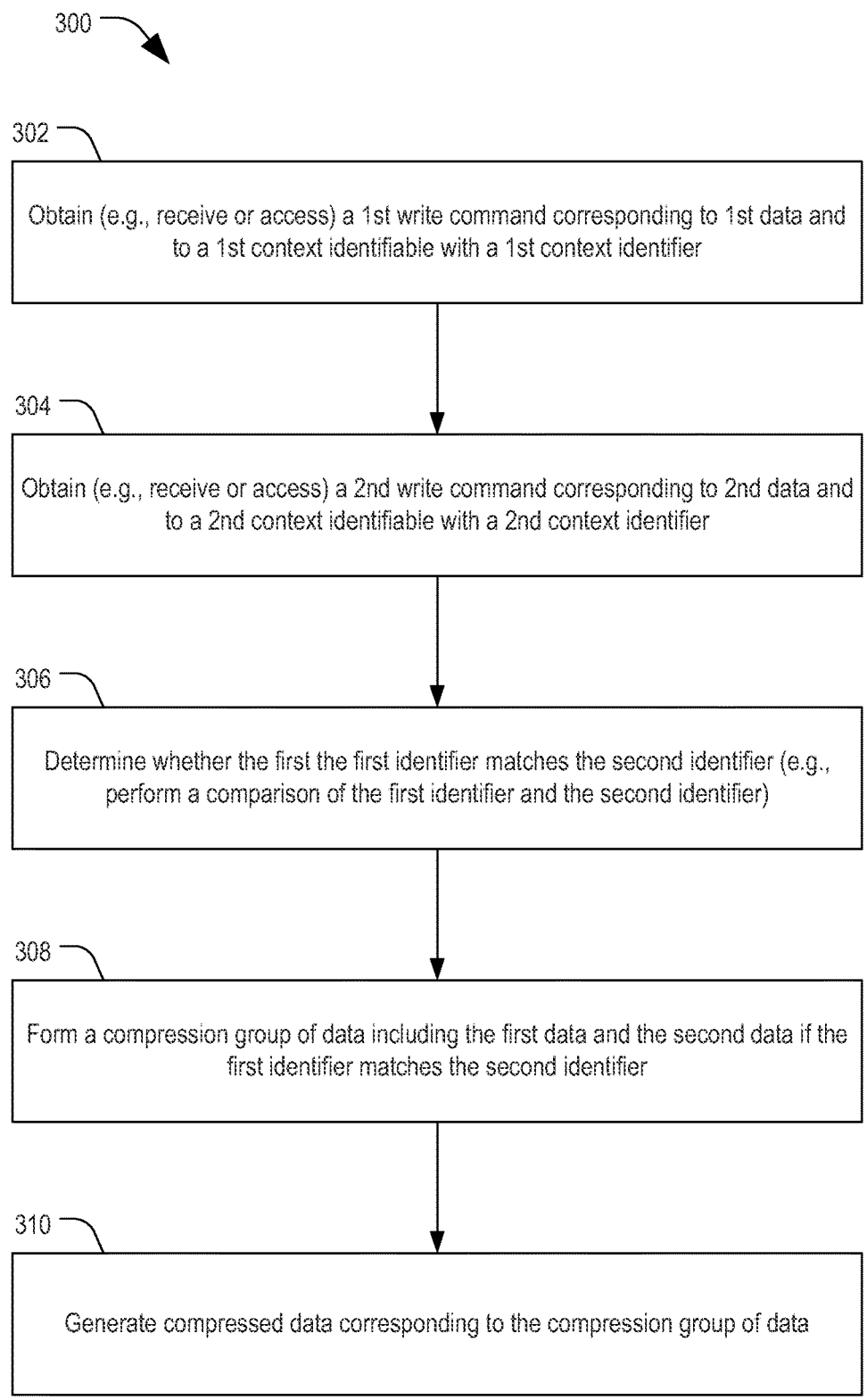
FIG. 3 is a flow diagram illustrating a first particular embodiment of a method of compressing data at a data storage device.

FIG. 3 is a flowchart illustrating a first particular embodiment of a method 300 of compressing data at a storage device. The data storage device may correspond to the data storage device 102 of FIG. 1, the data storage device 202 of FIG. 2, or both. For example, the method 300 may be performed at the controller 106 of FIG. 1 or at the controller 206 of FIG. 2.

The method 300 includes, at 302, obtaining (e.g., receiving or accessing) a first write command corresponding to the first data and a first context identifiable with a first context identifier, and, at 304, obtaining (e.g., receiving or accessing) a second write command corresponding to second data and a second context identifiable with a second context identifier. For example, the data storage device 102 of FIG. 1 may receive the first write command 126 and the second write command 128 from the host device 120. The first write command 126 may include first data and may be associated with a first context as indicated by a first context identifier, and the second write command 128 may include second data and be associated with a second context as indicated by a second context identifier.

The method 300 also includes, at 306, determining whether the first identifier matches the second identifier. The method 300 also includes, at 308, forming a compression group of data including the first data and the second data if the first identifier matches the second identifier. For example, referring to FIG. 1, the controller 106 may perform a comparison of the first context identifier corresponding to the first context of the first write command 126 to the second context identifier corresponding to the second context of the second write command 128. If the first context identifier matches the second context identifier, the controller 106 may select the first data and the second data for inclusion in the compression group of data. The controller 106 may then generate the compression group of data including the first data and the second data.

The method 300 also includes, at 310, generating compressed data corresponding to the compression group of data. For example, the controller 106 may determine that a size of the compression group of data satisfies a threshold size, or the controller 106 may receive a close context notification from a host device. The controller 106 may provide the compression group of data to the compression engine 108 to generate the compressed data 132. The compressed data 132 may be stored at the non-volatile memory 104.

Thus, the method 300 enables a data storage device to efficiently utilize storage capacity of the memory by compressing related data together. Additionally, by generating compressed data using a compression group of data corresponding to a single context, the data storage device avoids latency and power usage associated with decompressing large quantities of unrelated data during a read operation.

Figure 4:
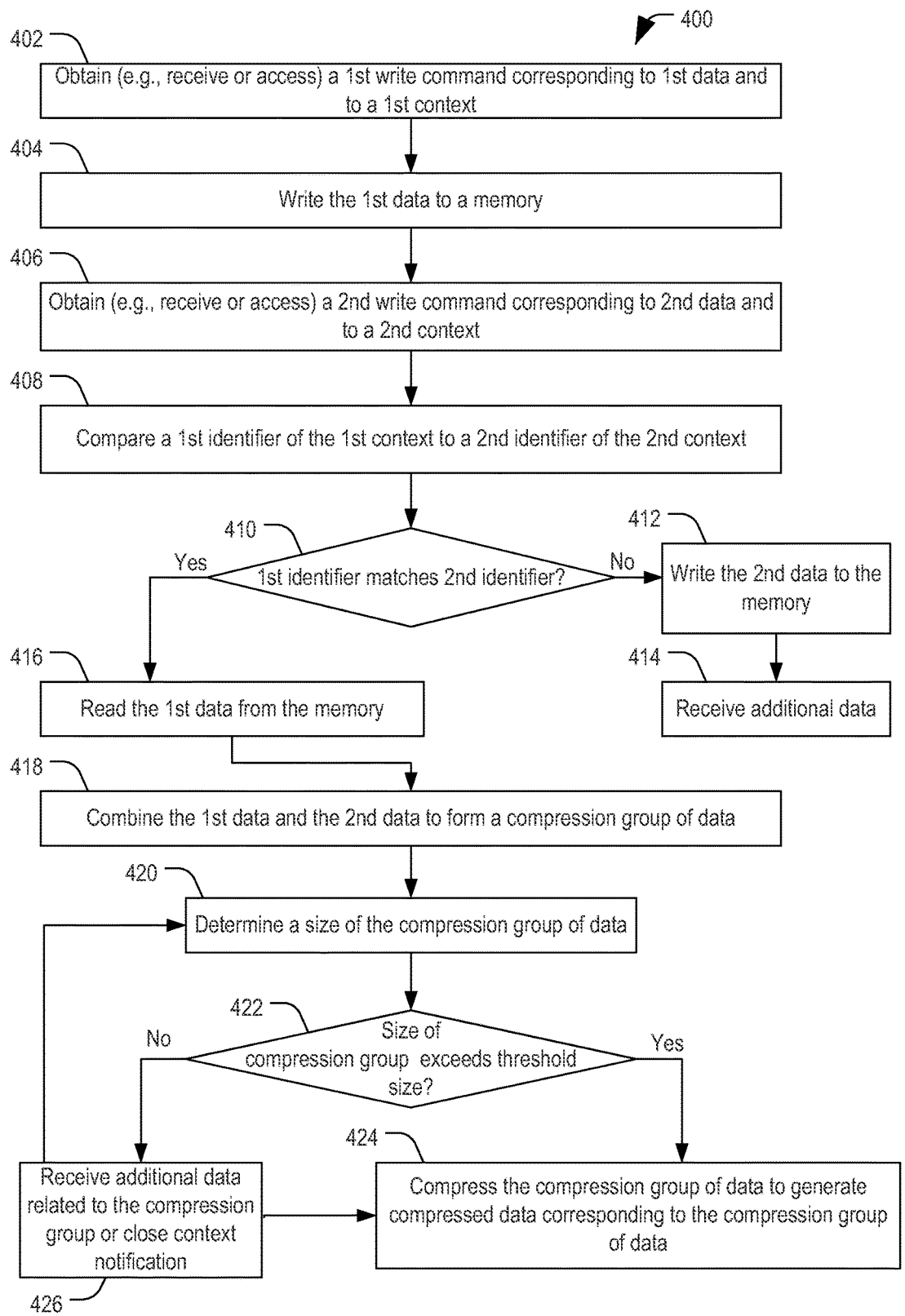
FIG. 4 is a flow diagram illustrating a second particular embodiment of a method of compressing data at a data storage device.

FIG. 4 is a flow diagram illustrating a second particular embodiment of the method 400 of compressing data at a data storage device. The data storage device may correspond to the data storage device 102 of FIG. 1, the data storage device 202 of FIG. 2, or both. For example, the method 400 may be performed at the controller 106 of FIG. 1 or at the controller 206 of FIG. 2.

The method 400 includes, at 402, obtaining (e.g., receiving or accessing) a first write command corresponding to a first data and a first context. The method 400 also includes, at 404, writing the first data to a memory. For example, the data storage device 202 of FIG. 2 may receive the first write command 222 including the first data 241 and a first context identifier from the host device 220. The first data 241 may be written to the first memory region 240.

The method 400 also includes, at 406, obtaining (e.g., receiving or accessing) a second write command corresponding to second data and a second context. For example, in FIG. 2, the data storage device 202 may receive the second write command 223 including the second data 242 and a second context identifier from the host device 220. The method 400 also includes, at 408, comparing the first context identifier of the first context to the second context identifier of the second context. When the first context identifier does not match the second context identifier, at 410, the method 400 includes writing the second data to the memory, at 412. For example, in FIG. 2, the second data 242 is associated with a second context that does not match context identifier associated with the first data. Accordingly the second data 242 is written to the first memory region 240. The second data may be compressed (independently of the first data) before being written to the first memory region 240. After writing the second data to the memory, at 412, the method includes receiving additional data, at 414. The additional data may include additional data related to the first context, additional data related to the second context, additional data related to another context, or a combination thereof. For example, in FIG. 2, after receiving the second write command 223, the data storage device 202 may receive one or more additional write commands, such as the third write command 224, the fourth write command 225, or the fifth write command 226. A context identifier associated with each additional write command that is received may be compared to context identifiers associated with data stored in the memory 204 to identify matching contexts. When data associated with matching contexts is identified, the data may be processed as described below for the example of the first identifier matching the second identifier.

When the first identifier matches the second identifier, at 410, the method 400 includes, at 416, reading the first data from the memory and, at 418, combining the first data and the second data to form a compression group of data. The method 400 may also include, at 420, determining a size of the compression group of data. When a size of the compression of data exceeds a threshold size, at 422, the method 400 includes compressing the compression group of data to generate compressed data corresponding to the compression group of data. When the size of the compression group of data does not exceed the threshold size, at 422, the method 400 includes, at 426, receiving additional data or a closed context notification. After receiving additional data related to the compression group of data or after receiving the closed context notification, the method 400 may include, at 424, compressing the compression group of data to generate compressed data corresponding to the compression group of data. For example, referring to FIG. 2, the first compressed data 251 may be generated after the close context notification 227 for the first context is received, or after the size of the first compression group of data reaches the threshold size.

Thus, the method 400 enables a data storage device to efficiently utilize storage capacity of the memory by compressing related data together. Additionally, by generating compressed data using a compression group of data corresponding to a single context, the data storage device avoids latency and power usage associated with decompressing large quantities of unrelated data during a read operation.

Figure 5:
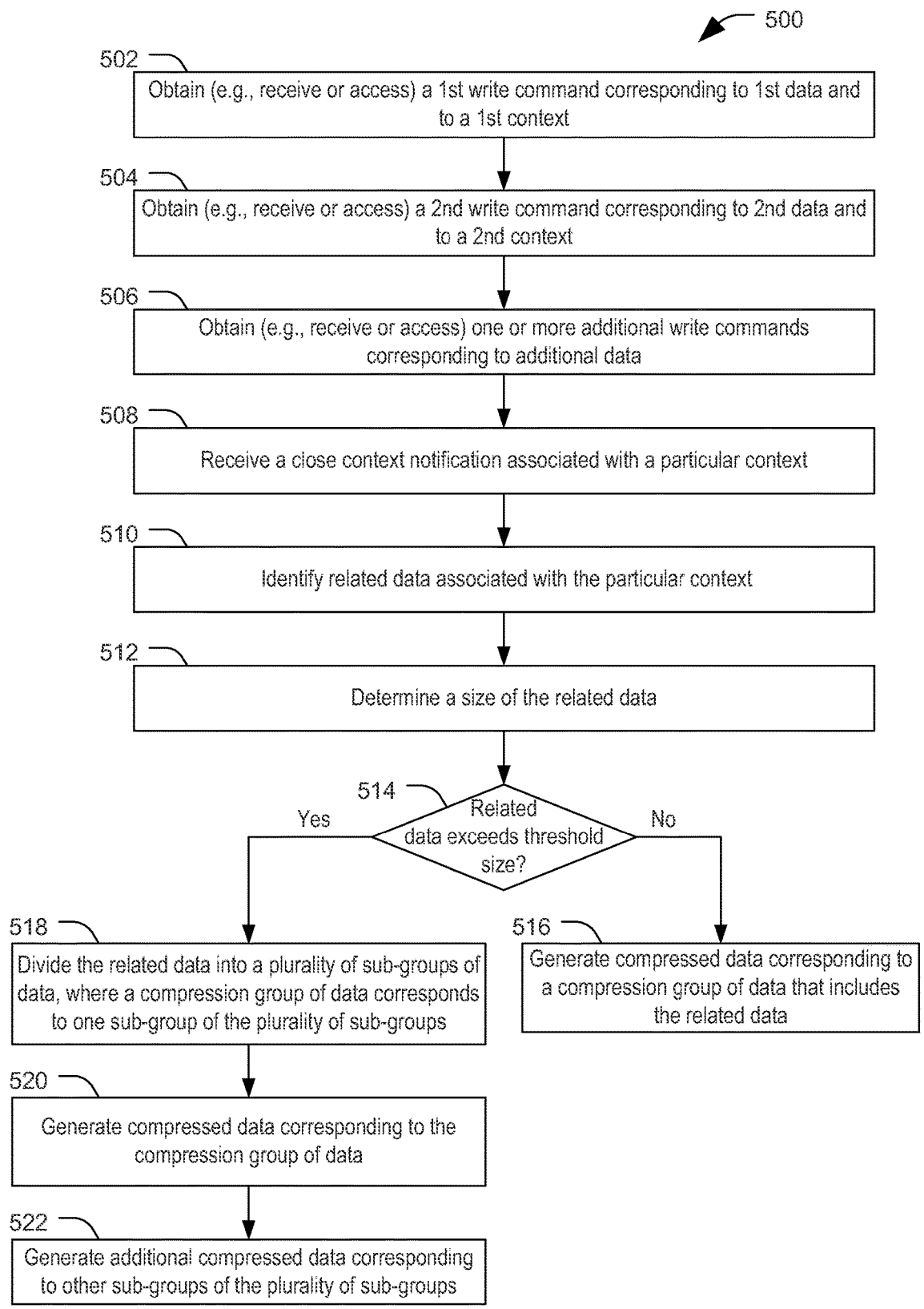
FIG. 5 is a flow diagram illustrating a third particular embodiment of a method of compressing data at a data storage device.

FIG. 5 is a flow diagram illustrating a third particular embodiment of a method 500 of compressing data at a data storage device. The data storage device may correspond to the data storage device 102 of FIG. 1, the data storage device 202 of FIG. 2, or both. For example, the method 500 may be performed at the controller 106 of FIG. 1 or at the controller 206 of FIG. 2.

The method 500 includes, at 502, obtaining (e.g., receiving or accessing) a first write command corresponding to the first data and a first context, and, at 504, obtaining (e.g., receiving or accessing) a second write command corresponding to second data and a second context. The first context and the second context may be the same or may be different. For example, the data storage device 202 of FIG. 2 may receive the first write command 222 and the second write command 223 from the host device 220. The first write command 222 includes the first data 241 and is associated with a first context (as indicated by the first context identifier), and the second write command 223 includes the second data 242 and is associated with a second context (as indicated by the second context identifier). In this example of the method 500, the first context is different than the second context. However, in another example from FIG. 2, the data storage device 202 of FIG. 2 may receive the first write command 222 and the third write command 224 from the host device 220. The first write command 222 includes the first data 241 and is associated with a first context (as indicated by a first context identifier), and the third write command 224 includes the third data 243 and is associated with the first context (as indicated by the first context identifier). In this example of the method 500, the first context is the same as the second context. The method 500 may also include, at 506, obtaining (e.g., receiving or accessing) one or more additional write commands corresponding to additional data. The one or more additional write commands may correspond to the first context, the second context, or an additional context (e.g., a third context).

The method 500 also includes, at 508, receiving a close context notification associated with a particular context. For example, referring to FIG. 2, the data storage device 202 may receive the close context notification 227 after receiving one or more of the write commands 222-226. The method 500 may include, at 510, identifying related data that is associated with the particular context. For example, in FIG. 2, the close context notification 227 is associated with the first context. Accordingly, the controller 206 may identify data stored in the first memory region 240 that is associated with the first context (e.g., the first data 241, the third data 243 and the fourth data 244).

The method 500 may also include, at 512, determining a size (e.g., a data size, such as a number of bits) of the related data. For example, referring to FIG. 2, the controller 206 may determine a size of the data stored in the first memory region 240 that is associated with the first context (e.g., the first data 241, the third data 243 and the fourth data 244). If the size of the related data does not exceed a threshold size, at 514, the method 500 includes, at 516, generating compressed data corresponding to a compression group of data including the related data. For example, in FIG. 2, the compression engine 208 may generate the first compressed data 251 corresponding to a first compression group of data the first data 241, the third data 243 and the fourth data 244, if the size of the first compression group of data is less than the threshold size.

If the size of the related data exceeds a threshold size, at 514, the method 500 includes, at 518, dividing the related data into a plurality of subgroups of data and generating a plurality of compression groups, where each compression group corresponds to one of the subgroups of data. The method 500 may also include, at 520, generating compressed data corresponding to the compression group of data (e.g., a subgroup of the related data), and, at 522, generating additional compressed data corresponding to one or more other compression groups of data (e.g., other subgroup of the related data). For example, in FIG. 2, the compression engine 208 may generate the first compressed data 251 corresponding to a first subgroup of data related to the first context (e.g., a first compression group of data including the first data 241 and the third data 243). The compression engine 208 may also generate the second compressed data 252 corresponding to a second subgroup of the data related to the first context (e.g., a second compression group of data including the fourth data 244).

Thus, the method 500 enables a data storage device to efficiently utilize storage capacity of the memory by compressing related data together. Additionally, by generating compressed data using a compression group of data corresponding to a single context, the data storage device avoids latency and power usage associated with decompressing large quantities of unrelated data during a read operation.

Figure 6:
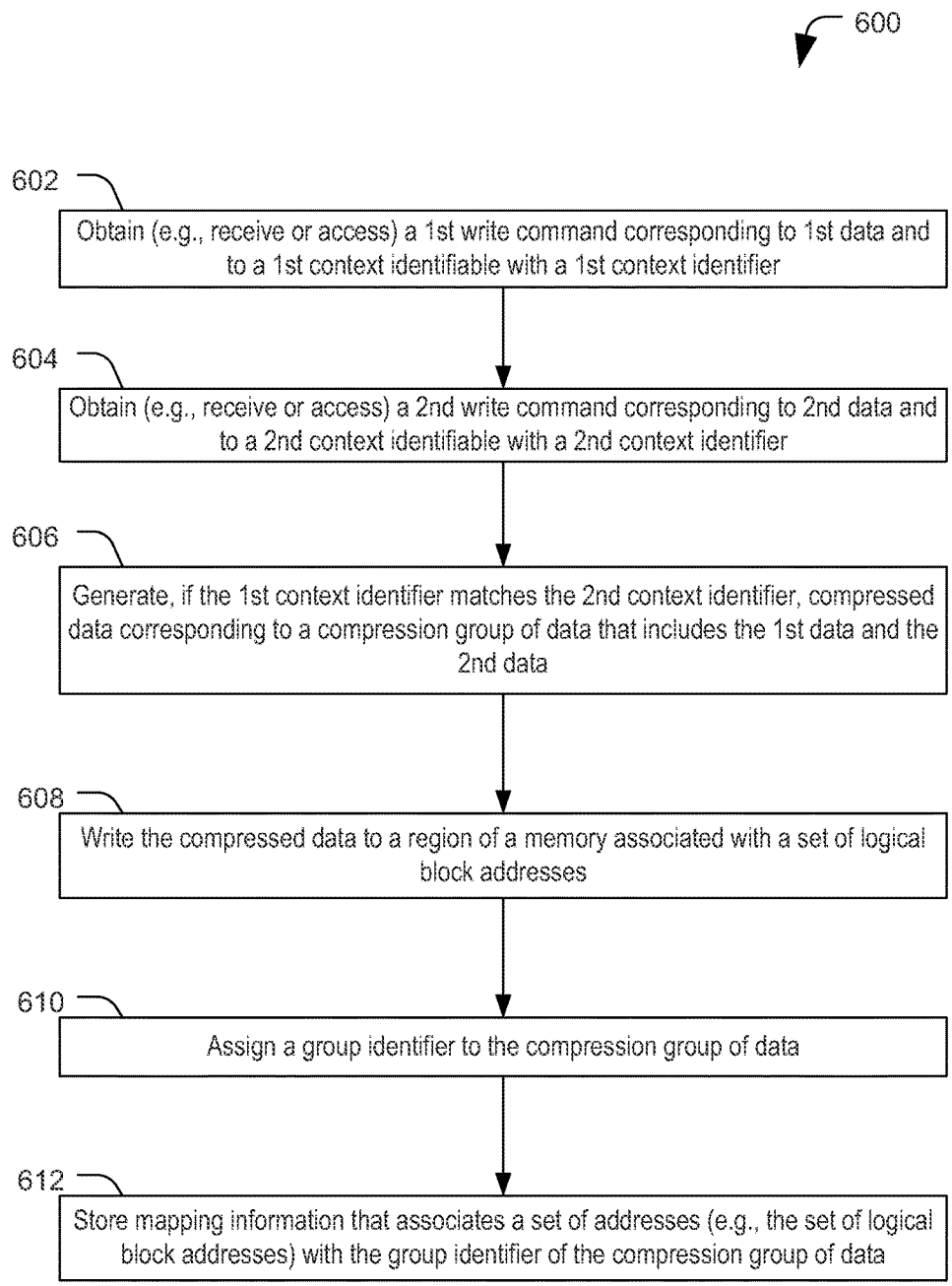
FIG. 6 is a flow diagram illustrating a fourth particular embodiment of a method of compressing data at a data storage device.

FIG. 6 is a flow diagram illustrating a fourth particular embodiment of a method 600 of compressing data at a data storage device. The data storage device may correspond to the data storage device 102 of FIG. 1, the data storage device 202 of FIG. 2, or both. For example, the method 600 may be performed at the controller 106 of FIG. 1 or at the controller 206 of FIG. 2.

The method 600 includes, at 602, obtaining (e.g., receiving or accessing) a first write command corresponding to the first data and a first context that is identifiable with a first context identifier, and, at 604, obtaining (e.g., receiving or accessing) a second write command corresponding to second data and a second context that is identifiable with a second context identifier. For example, the data storage device 202 of FIG. 2 may receive the first write command 222 and the second write command 223 from the host device 220. The first write command 222 includes the first data 241 and is associated with the first context as indicated by the first context identifier, and the second write command 223 includes the second data 242 and is associated with the second context as indicated by the second context identifier.

The method 600 also includes, at 606, if the first context identifier matches the second context identifier, generating compressed data corresponding to a compression group of data, where the compression group of data includes the first data and the second data. For example, in response to determining that the first context identifier of the first write command 222 of FIG. 2 matches the third context identifier of the third write command 224, the controller 206 may generate a compression group of data including the first data 241 and the third data 243. The controller 206 may provide the compression group of data to the compression engine 208 to generate the first compressed data 251 corresponding to the first data 241 and the third data 243. The method 600 also includes, at 608, writing the compressed data to a region of a memory. For example, referring to FIG. 2, the first compressed data 251 may be written to the second memory region 250, which may be associated with a set of logical block addresses identified in the logical-to-physical address table 216.

The method 600 includes, at 610, assigning a group identifier to the compression group of data (or the compressed data), and, at 612, storing mapping information that associates a set of addresses (e.g., the set of logical block addresses) with the group identifier of the compression group of data. For example, the controller 206 of FIG. 2 may store, at the mapping information 212, a group identifier associated with the first compression group of data (and the first compressed data) and information identifying a set of memory addresses at which compressed data for the first compression group of data is stored.

Thus, the method 600 enables a data storage device to efficiently utilize storage capacity of the memory by compressing related data together. Additionally, by generating compressed data using a compression group of data corresponding to a single context, the data storage device avoids latency and power usage associated with decompressing large quantities of unrelated data during a read operation.

Figure 7:
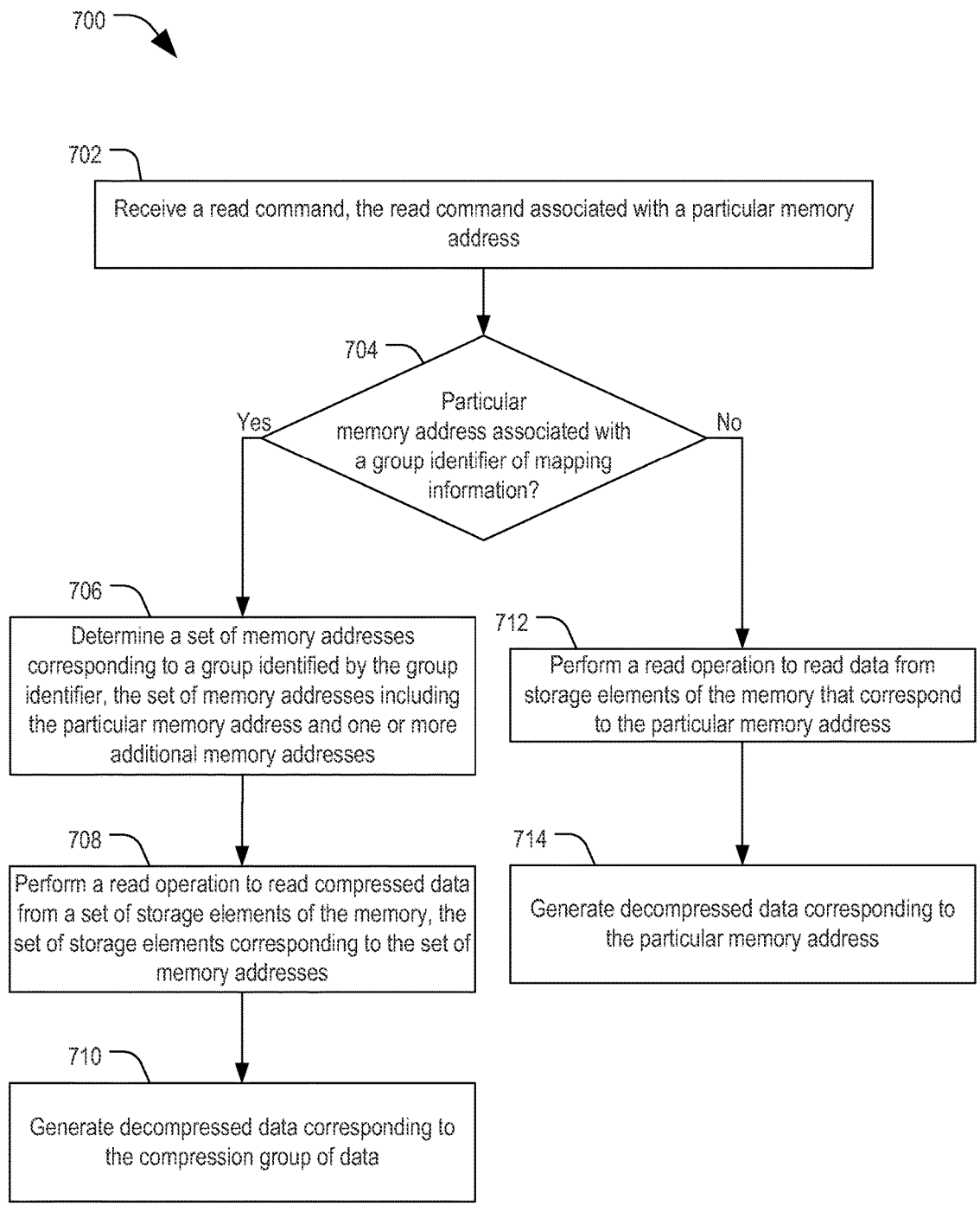
FIG. 7 is a flow diagram illustrating a particular embodiment of a method of reading compressed data from a data storage device.

FIG. 7 is a flow diagram illustrating a particular embodiment of a method 700 of reading compressed data from a data storage device. The data storage device may correspond to the data storage device 102 of FIG. 1, the data storage device 202 of FIG. 2, or both. For example, the method 700 may be performed at the controller 106 of FIG. 1 or at the controller 206 of FIG. 2. In a particular embodiment, the method 700 may be performed at a data storage device that has stored compressed data and mapping information according to the method 300, the method 400, the method 500, the method 600, or a combination thereof.

The method 700 includes, at 702, receiving a read command after storing mapping information, where the read command is associated with a particular memory address. For example, in FIG. 2, the data storage device 202 may receive the read request 228 from the host device 220. The read request 228 includes information identifying a memory address.

The method 700 includes, at 704, determining whether the particular memory address is associated with group identifier based on the mapping information. For example, the controller 206 may compare the address from the read request 228 to the mapping information 212 to determine whether the address of the read request 228 is associated with a group identifier in the mapping information 212.

When the particular memory address is associated with a group identifier, the method 700 includes, at 706, determining a set of memory addresses corresponding to a group identified by the group identifier, the set of memory addresses including the particular memory address and one or more additional memory addresses. For example, the controller 206 may use the mapping information 212 to identify a set of LBAs that correspond to the compression group of data. The controller 206 may also determine storage elements that correspond to the set of LBAs using the logical-to-physical address table 216.

The method 700 also includes, at 708, performing a read operation to read compressed data from a set of storage elements of the memory, the set of storage elements corresponding to the set of memory addresses, and, at 710, generating decompressed data corresponding to the compression group of data. For example, referring to FIG. 2, when the address of the read request 228 is associated with the group identifier of the first compression group of data (e.g., the compression group of data from which the first compressed data 251 was formed), the controller 206 may read multiple addresses from the second memory region 250, where each of the multiple addresses is associated with the group identifier. Thus, each storage element of a set of storage elements that includes data associated with the compression group of data may be read, even if the particular memory address corresponds to only a subset of the set of storage elements.

When the particular memory address is not associated with any group identifier, the method 700 includes, at 712, performing a read operation to read data from storage elements of the memory that correspond to the particular memory address (e.g., without reading other memory addresses), and, at 714, generating decompressed data corresponding to the particular memory address. For example, referring to FIG. 2, when the address indicated in the read request 228 is not associated with a group identifier in the mapping information 212, the controller 206 may read only data corresponding to the address indicated in the read request 228 to generate the data 230.

Although various components depicted herein are illustrated as block components and described in general terms, such components may include one or more microprocessors, state machines, or other circuits configured to enable a data storage device, such as the data storage device 102 of FIG. 1 or the data storage device 202 of FIG. 2, to perform the particular functions attributed to such components, or any combination thereof. Components described herein may be operationally coupled to one another using one or more nodes, one or more buses (e.g., data buses and/or control buses), one or more other structures, or a combination thereof. One or more components described herein (e.g., the controller 106 of FIG. 1 or the controller 206 of FIG. 2) may represent physical components, such as hardware controllers, state machines, logic circuits, or other structures to instruct the compression engine 108, the context comparator 110, the compression engine 208, the context comparator 210, or a combination thereof, to generate compressed data (such as the compressed data 132, the compressed data 251, or the compressed data 252).

The controller 106 or the controller 206 may be implemented using a microprocessor or microcontroller programmed to generate the compressed data (e.g., using one or more operations of the method 300 of FIG. 3, the method 400 of FIG. 4, the method 500 of FIG. 5, or the method 600 of FIG. 6) or to generate decompressed data (e.g., using one or more operations of the method 700 of FIG. 7). In a particular embodiment, the controller 106 or the controller 206 includes a processor executing instructions that are stored at the memory 104 or the memory 204, respectively. Alternatively, or in addition, executable instructions that are executed by the processor may be stored at a separate memory location that is not part of the memory 104 or the memory 204, such as at a read-only memory (ROM) (not shown).

To further illustrate, a controller (e.g., the controller 106 or the controller 206) may include a processor that is configured to execute instructions to perform certain operations described herein. The processor may include an execution unit operable to execute the instructions. The processor may execute the instructions to receive commands from a host device (e.g., to receive the first write command 222 and the second write command 223 of FIG. 2). For example, the processor may execute one or more instructions related to a communication protocol, such as instructions to implement a JEDEC industry specification, such as an eMMC specification, a Universal Flash Storage (UFS) specification, a USB specification, or a SD specification. The processor may further execute the instructions to compare context identifiers. For example, the processor may execute one or more instructions to perform a comparison of a first identifier of a first context associated with a first write command and a second identifier of a second context associated with a second write command. In another example, the processor may execute one or more instructions to provide the first identifier and the second identifier to a context comparator, such as the context comparator 110 of FIG. 1 or the context comparator 210 of FIG. 2. The processor may further execute the instructions to form a compression group of data including the first data and the second data conditioned upon the comparison indicating that the first identifier matches the second identifier. For example, the processor may execute one or more instructions to combine (e.g., merge) the first data and the second data if the first identifier matches the second identifier. The processor may further execute the instructions to generate compressed data corresponding to the compression group of data. For example, the processor may execute one or more instructions to perform data compression using Huffman coding, Arithmetic coding, Prediction with Partial string Matching (PPM) compression, Context-Tree Weighing (CTW) compression, Lempel-Ziv (LZO) coding, or another compression technique.

The data storage device 102 or the data storage device 202 may be attached or embedded within one or more host devices, such as within a housing of a portable communication device. For example, the data storage device 102 or the data storage device 202 may be within a packaged apparatus, such as a wireless telephone, a personal digital assistant (PDA), gaming device or console, a portable navigation device, or other device that uses internal non-volatile memory. However, in other embodiments, the data storage device 102 or the data storage device 202 may be a portable device configured to be selectively coupled to one or more external devices.

To further illustrate, a data storage device (e.g., the data storage device 102 or the data storage device 202) may be configured to be coupled to a host device (e.g., the host device 120 or the host device 220) as embedded memory, such as in connection with an embedded MultiMedia Card (eMMC®) (trademark of JEDEC Solid State Technology Association, Arlington, Va.) configuration, as an illustrative example. The data storage device may correspond to an eMMC device. As another example, the data storage device may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device may operate in compliance with a JEDEC industry specification. For example, the data storage device may operate in compliance with a JEDEC eMMC specification, a JEDEC Universal Flash Storage (UFS) specification, one or more other specifications, or a combination thereof.

In particular embodiments, a memory (e.g., the memory 104 or the memory 204) includes a three-dimensional (3D) memory, such as a resistive random access memory (ReRAM), a flash memory (e.g., a NAND memory, a NOR memory), a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively or in addition, the memory may include another type of memory. The memory may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used to facilitate operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    at a data storage device that includes a controller and a memory having single level cells storing first data associated with a first write command from an accessing device and associated with information from the accessing device indicating whether the first data is compressible, the first write command corresponding to a first context identifiable with a first context identifier included with the first write command, and having multilevel cells, performing:
        in response to a second write command from the accessing device, the second write command corresponding to second data and a second context identifiable with a second context identifier included with the second write command, determining whether the first context identifier of the first context matches the second identifier of the second context;
        if the first context identifier of the first context is determined to match the second context identifier of the second context, forming a group of data including the first data and the second data, the first context identifier assigned by the accessing device to indicate a first operational context associated with the first data within the accessing device, the second context identifier assigned by the accessing device to indicate a second operational context associated with the second data within the accessing device; and
        writing compressed data to a portion of the multilevel cells, the compressed data corresponding to a compression group of data and including at least one of the first data or the second data.

2. The method of claim 1, wherein the accessing device includes a host device, and further comprising:
    writing the first data to the memory prior to responding to the second write command; and
    after responding to the second write command, if the first identifier matches the second identifier:
        reading the first data from the memory;
        combining the first data and the second data to form the group of data; and
        compressing the group of data to generate the compressed data.

3. The method of claim 1, further comprising determining a size of the group of data, wherein the compressed data is generated responsive to determining that the size of the group of data exceeds a threshold size.

4. The method of claim 1, further comprising:
    before generating the compressed data, receiving one or more additional write commands corresponding to additional data;

receiving a close context notification associated with a particular context;

after receiving the close context notification, identifying related data received via one or more write commands and associated with the particular context;

determining a size of the related data;

if the size of the related data exceeds a threshold size, dividing the related data into a plurality of sub-groups of data, wherein the group of data corresponds to one sub-group of the plurality of sub-groups; and generating additional compressed data corresponding to other sub-groups of the plurality of sub-groups.

5. The method of claim 1, wherein the compressed data is generated after receiving data from the accessing device indicating that the first data and the second data are compressible.

6. The method of claim 1, wherein the first context identifier and the second context identifier are context identifiers received from the accessing device according to an embedded MultiMedia Card (eMMC) standard.

7. The method of claim 1, wherein the first context identifier and the second context identifier are context identifiers received from the accessing device according to a Universal Flash Storage (UFS) standard.

8. The method of claim 1, wherein the compression group of data includes the first data and the second data, wherein the compressed data is written to a region of the memory associated with a set of memory addresses of the memory, and further comprising:

storing mapping information that associates the set of memory addresses with a group identifier of the compression group of data.

9. The method of claim 8, wherein the set of memory addresses corresponds to a sequential range of logical block addresses.

10. The method of claim 8, further comprising:

receiving a read command after storing the mapping information, the read command associated with a particular memory address;

determining whether the particular memory address is associated with the group identifier based on the mapping information;

if the particular memory address is associated with the group identifier, reading each memory address of the set of memory addresses associated with the group identifier; and generating decompressed data corresponding to the compression group of data using data read from the set of memory addresses.

11. The method of claim 8, wherein the group identifier is a context identifier of the first context or of the second context.

12. The method of claim 8, further comprising assigning the group identifier to the compression group of data, wherein the group identifier is distinct from the first context identifier and is distinct from the second context identifier.

13. The method of claim 1, further comprising:

in response to a third write command corresponding to third data and to a third context identifiable with a third context identifier, determining whether the third context identifier matches the first context identifier;

if the third context identifier does not match the first context identifier, generating second compressed data corresponding to the third data; and if the third context identifier matches the first context identifier, adding the third data to the group of data before generating the compressed data.

14. The method of claim 1, wherein the memory has a three-dimensional (3D) memory configuration.

15. The method of claim 14, wherein:

the 3D memory configuration is monolithically formed in one or more physical levels of arrays of memory cells of a memory die having an active area above a silicon substrate, and the memory die further includes circuitry associated with operation of the memory cells.

16. A data storage device comprising:

a controller; and a memory coupled to the controller and having single level cells storing first data associated with a first write command from an access device and associated with information from the access device indicating whether the first data is compressible, wherein the controller is configured to:

perform a comparison of a first context identifier associated with a first context and included with the first write command and a second context identifier associated with a second context and included with a second write command from the access device, the first context identifier assigned by the accessing device to indicate a first operational context associated with the first data within the accessing device, the second context identifier assigned by the accessing device to indicate a second operational context associated with second data within the accessing device; and write compressed data to multilevel cells of the memory if the first context identifier matches the second context identifier, the compressed data generated by compressing a compression group of data including at least one of the first data or second data corresponding to the second write command.

17. The data storage device of claim 16, wherein the controller is further configured to:

write the first data to the memory prior to generating the compressed data; and after performing the comparison, if the first context identifier matches the second context identifier:

read the first data from the memory; and combine the first data and the second data to form the compression group of data.

18. The data storage device of claim 16, wherein:

the first context identifier and the second context identifier are context identifiers received according to a Joint Electron Devices Engineering Council (JEDEC) industry specification, and the controller is further configured to, if the context identifiers do not match, generate particular compressed data associated with the context identifiers.

19. The data storage device of claim 16, wherein the first context identifier and the second context identifier are context identifiers received from the access device according to an embedded MultiMedia Card (eMMC) standard or a Universal Flash Storage (UFS) standard.

20. The data storage device of claim 16, wherein:

the multilevel cells are associated with a set of memory addresses of the memory, and the controller is further configured to, if the first context identifier matches the second context identifier: store mapping information that associates the set of memory addresses with a group identifier associated with the compression group of data.

21. The data storage device of claim 20, wherein the set of memory addresses corresponds to a sequential range of logical block addresses.

22. The data storage device of claim 20, wherein the controller is further configured to:
receive a read command after storing the mapping information, the read command associated with a particular memory address;
determine whether the particular memory address is associated with the group identifier based on the mapping information;
if the particular memory address is associated with the group identifier, read each memory address of the set of memory addresses; and
generate decompressed data corresponding to the compression group of data using data read from the set of memory addresses.

23. The data storage device of claim 20, wherein the group identifier is a context identifier of the first context or of the second context.

24. The data storage device of claim 20, wherein the controller is further configured to assign the group identifier to the compression group of data, wherein the group identifier is distinct from the first context identifier and is distinct from the second context identifier.

25. The data storage device of claim 16, wherein the memory has a three-dimensional (3D) memory configuration.

26. The data storage device of claim 25, wherein:
the 3D memory configuration is monolithically formed in one or more physical levels of arrays of memory cells of a memory die having an active area above a silicon substrate, and
the memory die further includes circuitry associated with operation of the memory cells.

27. A method comprising:
at a data storage device that includes a controller and a memory having single level cells to store information associated with an indicator from an accessing device indicating whether the information is compressible and associated with a context identifier included with a command from the accessing device, the context identifier assigned by the accessing device to indicate an operational context associated with the information within the accessing device operational context associated with second data within the accessing device, performing:
in response to a read command from the accessing device and associated with a particular memory address, determining, based on mapping information that maps memory addresses of multilevel cells of the memory to group identifiers associated with compression groups of data, whether the particular memory address is associated with any of the group identifiers; and
if the particular memory address is associated with a group identifier:
determining a set of memory addresses corresponding to a compression group of data identified by the group identifier, the set of memory addresses including the particular memory address and one or more additional memory addresses;
performing a read operation to read compressed data from a set of storage elements of the memory, the set of storage elements corresponding to the set of memory addresses; and
generating decompressed data corresponding to the compressed data.

28. The method of claim 27, further comprising, if the particular memory address is not associated with any of the group identifiers:
performing a read operation to read data from storage elements of the memory that correspond to the particular memory address; and
generating decompressed data corresponding to the particular memory address.

29. The method of claim 27, wherein the mapping information is stored in the memory by the controller after the controller forms the compression group of data.

30. The method of claim 27, wherein the group identifier is assigned to the compression group of data by the controller.

31. An apparatus comprising:
means for storing information, the means for storing having single level cells configured to store first data associated with a first write command from means for providing access to the means for storing and associated with information from the means for providing access indicating whether the first data is compressible; and
means for controlling the means for storing,
wherein the means for controlling is configured to:
perform a comparison of a first context identifier associated with a first context and included with the first write command and a second context identifier associated with a second context and included with a second write command from the means for providing access, the first context identifier assigned by the means for providing access to indicate a first operational context associated with the first data within the means for providing access, the second context identifier assigned by the means for providing access to indicate a second operational context associated with the second data within the means for providing access; and
write compressed data to multilevel cells of the means for storing if the first context identifier matches the second context identifier, the compressed data generated by compressing a compression group of data including at least one of the first data or second data corresponding to the second write command.

32. The apparatus of claim 31, wherein the means for controlling is further configured to:
write the first data to the means for storing prior to generating the compressed data; and
after performing the comparison, if the first context identifier matches the second context identifier:
read the first data from the means for storing; and
combine the first data and the second data to form the compression group of data.

* * * * *